US005729058A

United States Patent [19]

Groeller

[11] Patent Number: 5,729,058
[45] Date of Patent: Mar. 17, 1998

[54] TRAILER VOLTAGE ADAPTER

[75] Inventor: Charles J. Groeller, Allentown, Pa.

[73] Assignee: Mack Trucks, Inc., Allentown, Pa.

[21] Appl. No.: 689,490

[22] Filed: Aug. 12, 1996

[51] Int. Cl.$^6$ ...................................................... B60L 1/14
[52] U.S. Cl. ........................ 307/10.8; 307/10.1; 315/77
[58] Field of Search ........................... 307/9.1, 10.1,
307/10.8, 151; 315/77; 280/DIG. 14; 439/34–36;
340/463–479

[56] References Cited

U.S. PATENT DOCUMENTS

| | | |
|---|---|---|
| 2,671,891 | 3/1954 | Kent . |
| 3,894,242 | 7/1975 | Helling ........................... 307/10.1 |
| 3,970,860 | 7/1976 | Purdy ............................. 307/10.8 |
| 4,064,413 | 12/1977 | Andersen ........................ 315/77 |
| 4,751,431 | 6/1988 | Ducote ............................ 315/77 |
| 5,030,938 | 7/1991 | Bondzeit ......................... 315/77 |
| 5,170,067 | 12/1992 | Baum et al. ..................... 307/10.1 |
| 5,212,469 | 5/1993 | Avellino ......................... 307/10.8 |
| 5,283,513 | 2/1994 | Fujita et al. .................... 307/10.1 |
| 5,397,924 | 3/1995 | Gee et al. ....................... 307/9.1 |

*Primary Examiner*—Richard T. Elms
*Attorney, Agent, or Firm*—Rothwell, Figg, Ernst & Kurz, P.C.

[57] ABSTRACT

A trailer voltage adapter includes a voltage converter which can be powered by the electrical system of a tractor and provide electrical power at a second voltage required by the electrical lighting system of the trailer. A plurality of relays are controlled by trailer lamp signals from the tractor and provide electrical power to the electrical lighting system of the trailer at the second voltage in accordance with the trailer lamp signals from the tractor.

4 Claims, 2 Drawing Sheets

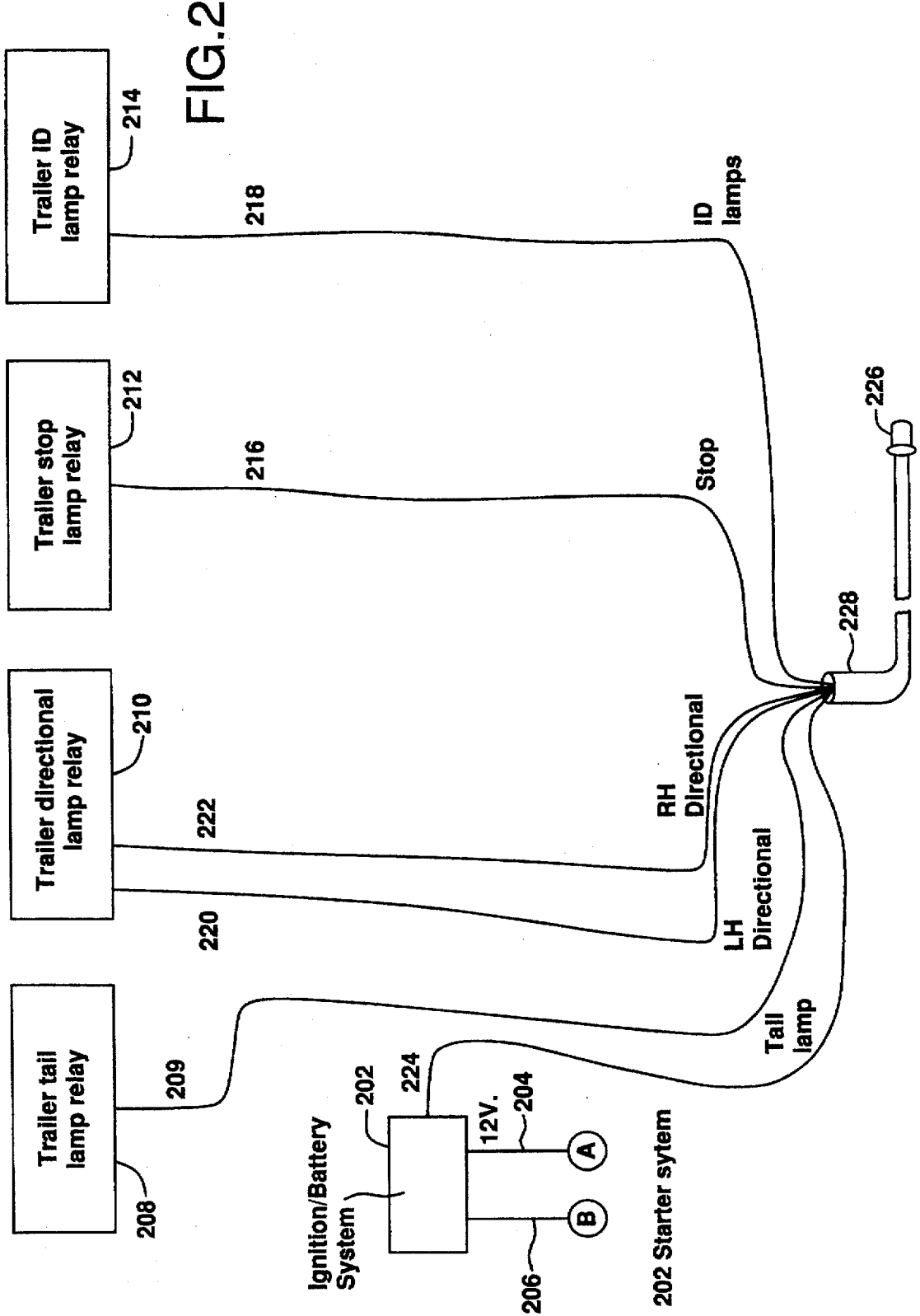

TRAILER VOLTAGE ADAPTER

BACKGROUND OF THE INVENTION

Field of the Invention

This invention relates generally to the electrical coupling of trailers and the motor vehicles which tow them and more particularly to the situation where the electrical system of the towing vehicle operates at one voltage and the electrical system of the trailer operates at a different voltage, thus requiring a voltage conversion.

In many parts of the world though the majority of the tractors for pulling trailers operate with a 12 volt electrical system, trailers are in use which require 24 volt power and other trailers require 12 volt power. Therefore, there is a need for an adapter which can allow a tractor with a 12 volt electrical system to provide a 24 volt electrical output to power a trailer requiring 24 volt power inputs.

SUMMARY OF THE INVENTION

The present invention overcomes the disadvantages of the prior art by providing a trailer voltage adapter which can receive the power and trailer lamp control signals from the tractor at one voltage and provide trailer lamp signals at a second voltage.

The trailer voltage adapter of the present invention provides a voltage converter which can be powered by the tractor and provide electrical power at a second voltage required by the electrical lighting system of the trailer. A plurality of relays are controlled by trailer lamp signals from the tractor and provide electrical power at the second voltage to the electrical lighting system of the trailer in accordance with the trailer lamp signals from the tractor.

BRIEF DESCRIPTION OF THE DRAWINGS

The present invention will become more fully understood from the detailed description given hereinbelow and the accompanying drawings, which are given for purposes of illustration only and are not limitative of the present invention, and wherein:

FIG. 2 is a block diagram of the electrical circuit of a tractor.

DETAILED DESCRIPTION OF THE PREFERRED EMBODIMENT

Figure 1:
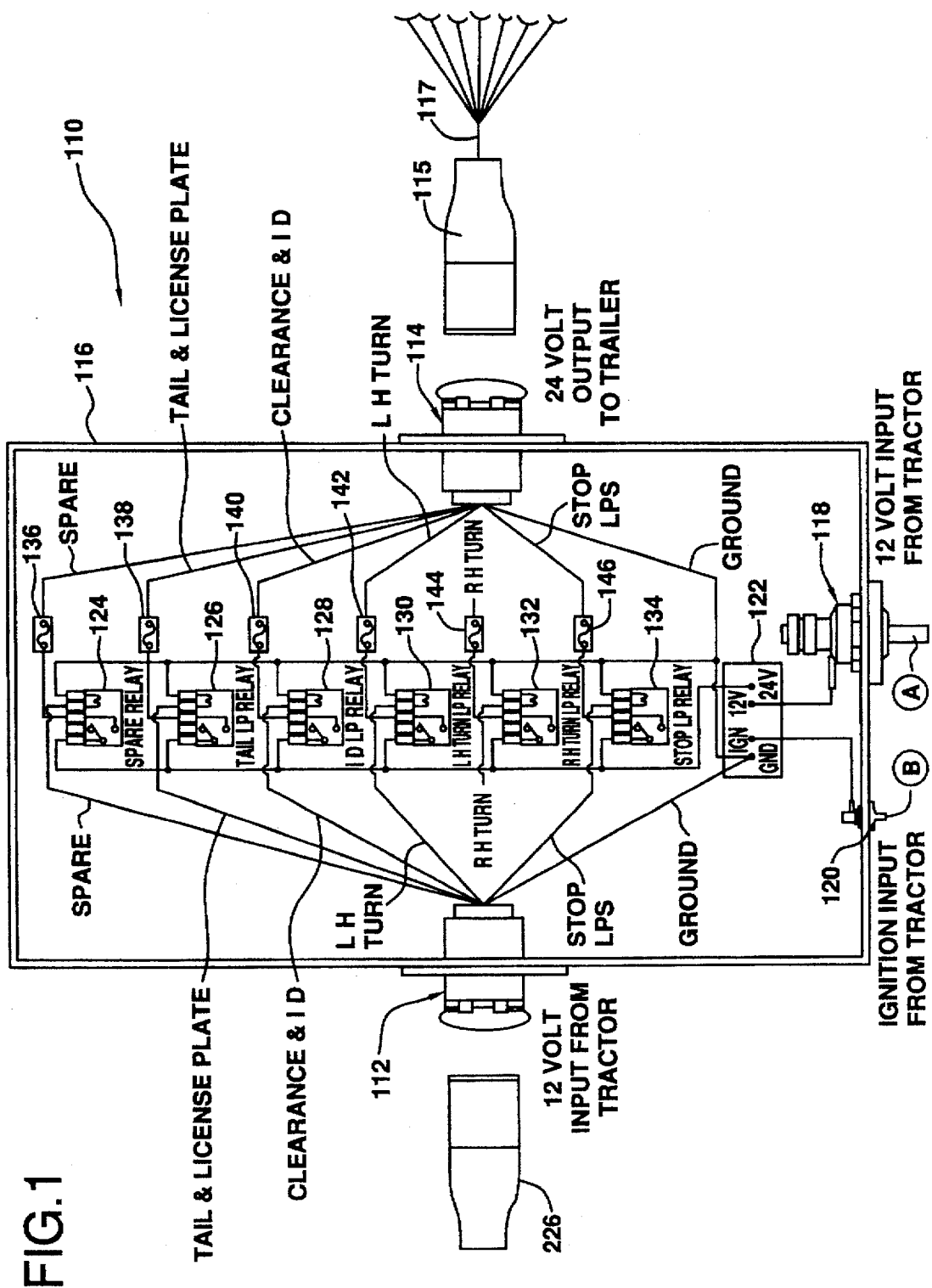
FIG. 1 is a block diagram of a voltage adapter circuit according to one embodiment of the present invention.

FIG. 1 is a block diagram of trailer voltage adapter according to a preferred embodiment of the present invention. The trailer voltage adapter is indicated generally as 110. The trailer voltage adapter is housed within a housing 116. Preferably the housing is securely mounted on the body of the tractor (not shown).

An input cable receptacle 112 is configured to receive a tractor cable plug 226 (see FIG. 2) from the tractor. The tractor cable plug 226 is coupled to the electrical system of the tractor via a tractor cable 228 (see FIG. 2). In a preferred embodiment, the tractor cable 228 and the tractor cable plug 226 comply with SAE standard J560 and 1067 and provides ground, ID lamp, LH directional, stop lamps, RH directional, and tail lamps signals (the trailer lamp signals) to the trailer voltage adapter. When the trailer voltage adapter is not being used, i.e., when the electrical system of the trailer operates at the same voltage as the tractor, the tractor cable plug 226 connects directly with a coupling cable from the trailer. When the electrical system of the tractor is at the same voltage as that required by the electrical system of the trailer, the aforementioned signals directly power the corresponding lights of the trailer.

An output cable receptacle 114 is provided to receive the coupling cable from the trailer (not shown). In a preferred embodiment the cable receptacle 114 complies with SAE J560 or, alternatively, ISO 3731. The terminal 118 receives a 12 volt power supply line from the tractor and thereby provides 12 volt power to a 12 volt to 24 volt converter 122. An output from the ignition system of the tractor is coupled to ignition input 120 to provide an on/off signal to the voltage converter 122.

A series of relays 124, 126, 128, 130, 132 and 134, conditionally couple the 24 volt output from the voltage converter 122 to specific pins within the output cable receptacle 114. The specific pin assignments are preferably defined by SAE J560 or, alternatively, by ISO 3731. The power outputs of each of the relays includes a fuse (136, 138, 140, 142, 144, and 146). Each relay is controlled by a specific signal originating in the tractor and transmitted through the input cable receptacle 112 via the tractor cable plug.

For example, relay 134 couples the 24 volt output from the voltage converter 122 to the pin on output cable receptacle 114 which connects to the cable from the trailer and thereby provides power to the brake lights of the trailer. The 12 volt stop light signal from the tractor is passed along the tractor cable plug through the input cable receptacle 112 to the control input of relay 134. When the stop light signal from the trailer is present the coil of relay 134 is energized completing the circuit between the 24 volt output of the voltage converter and the stop light pin on the output cable receptacle 114.

The ground reference from the electrical system of the tractor is coupled by a trailer cable receptacle 112 to the voltage converter 122 and also out through the trailer cable receptacle 114 to the electrical system of the trailer. That same ground signal is also supplied to each of the relays 124, 126, 128, 130, 132, and 134. The 24 volt power output is coupled to each of the power inputs of the relays 124, 126, 128, 130, 132, and 134. The power outputs of each of the relays is uniquely coupled to the corresponding pin of the trailer cable receptacle 114 correlating to the signal that is providing the control of that relay. For example, the left turn signal from the tractor is coupled to the control of relay 130. Therefore, the power output of relay 130 is coupled to the pin in trailer cable receptacle 114 which will be coupled via a connector 115 and cable 117 to the trailer and thereby provide power to the left turn lights.

FIG. 2 contains a block diagram which shows portions of the electrical system of a tractor which relate to generating trailer lamp signals for controlling the electrical lighting system of a tractor, indicated generally as 200.

The ignition/battery system is represented by box labeled 202. The ignition/battery system preferrably includes three 12 volt batteries in parallel, a starter and associated hardware and circuitry known to those of ordinary skill in the art (not shown). The ignition/battery system 202 performs the starter function and provides the electrical power for the tractor.

A 12 volt power supply line 204 from the ignition/battery system 202 provides 12 volt power to the voltage converter 122 via terminal 118. An output via line 206 from the ignition/battery system 202 is coupled to ignition input 120 to provide an on/off signal to the voltage converter 122 in accordance with whether the ignition of the tractor is on or off. A ground is provided from the ignition/battery system 202 along line 224 which is incorporated into tractor cable 228.

A trailer tail lamp relay circuit 208 is provided along line 209 which is incorporated into tractor cable 228. This line controls the trailer tail lamps. The circuitry in the tractor associated with this line can be constructed in a typical manner known to those of ordinary skill in the art.

Similarly, the trailer stop lamp relay 212 and the trailer ID lamp relay 214 provide electrical connections along lines 216 and 218, respectively, which are incorporated into tractor cable 228. These electrical connections control the trailer stop lamps and the trailer ID lamps, respectively. The circuitry in the tractor associated with these electrical connections can be constructed in a typical manner known to those of ordinary skill in the art.

A trailer directional lamp circuit 210 provides a connection along line 220 to control the left hand directional lamps of the trailer and a connection along line 222 to control the right hand directional lamps of the trailer. Both of those connections are incorporated into tractor cable 228. The circuitry associated with developing the connections to control the left hand and right hand directional lamps of the trailer can be of a type known to those of ordinary skill in the art. In a preferred embodiment, all of the foregoing connections for controlling the various lamps of the trailer are in compliance with SAE J560.

The invention having been thus described, it will be apparent to those skilled in the art that the same may be varied in many ways without departing from the spirit and scope of the invention. Any and all such modifications are intended to be covered by the following claims.

What is claimed is:

1. A trailer voltage adapter for use with a tractor having an electrical system for operating at a first voltage and a trailer having an electrical system for operating at a second voltage, comprising:

a voltage converter configured to receive electrical power at a first voltage from the tractor and to provide an output of electrical power at a second voltage;

a plurality of relays, each of said plurality of relays having a power input, a power output and a control input, with the power input electrically coupled to the power output according to a signal provided at said control input, each power input of each of said plurality of relays being coupled to said output of said voltage converter; and said adapter configured to receive input signals from the tractor for said signals provided at said control inputs, whereby said relays couple said power inputs to said power outputs based on the input signals received from the tractor to power the electrical system of the trailer at the second voltage.

2. A trailer voltage adapter for use with a tractor having an electrical system for operating at a first voltage and a trailer having an electrical lighting system for operating at a second voltage, the tractor configured to supply a plurality of lighting control signals at the first voltage via a tractor cable, the trailer voltage adapter comprising:

a voltage converter configured to receive electrical power at the first voltage from the tractor and to provide an output of electrical power at the second voltage; and a plurality of relays, each of said plurality of relays having a power input, a power output and a control input, with the power input electrically coupled to the power output according to a signal provided at said control input, and with each power input of each of said plurality of relays being coupled to said output of said voltage converter; and a connector for receiving the tractor cable, said connector coupled to each of said control inputs of said plurality of relays, and said connector configured to couple the plurality of lighting control signals to said control inputs of said plurality of relays.

3. The adapter of claim 2, wherein said first voltage is 12V and said second voltage is 24V.

4. A trailer voltage adapter comprising:

a voltage converter configured to receive electrical power at a first voltage from a tractor and to provide an output of electrical power at a second voltage;

a plurality of relays, each of said plurality of relays having a power input, a power output and a control input, with the power input electrically coupled to the power output according to a signal provided at said control input, each power input of each of said plurality of relays being coupled to said output of said voltage converter; and wherein said first voltage is 12V and said second voltage is 24V.

* * * * *